Feb. 7, 1956 A. E. DENTLER 2,733,915
SHOCK ABSORBING MECHANISMS FOR RAILWAY CAR TRUCKS
Filed Nov. 3, 1952
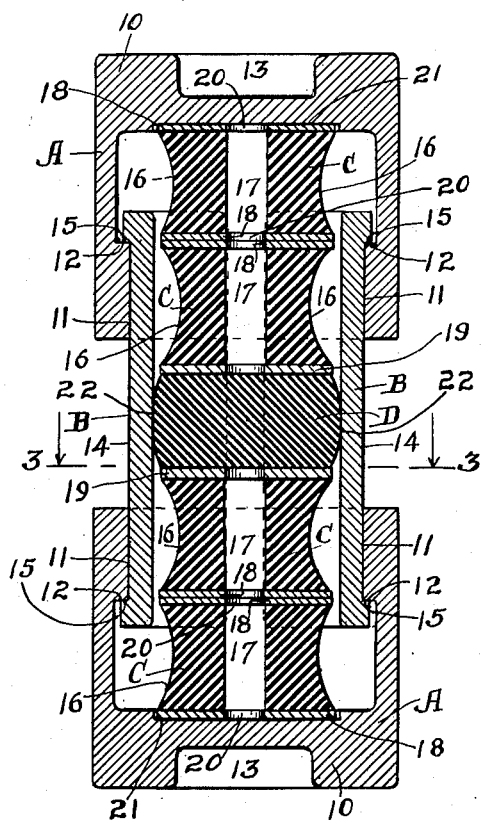
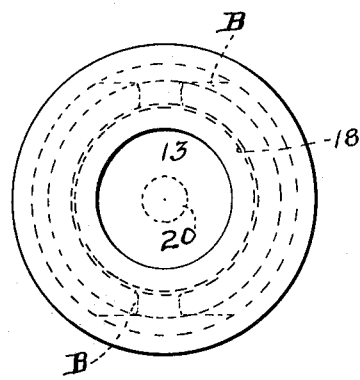
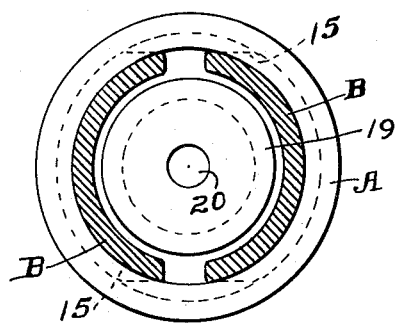
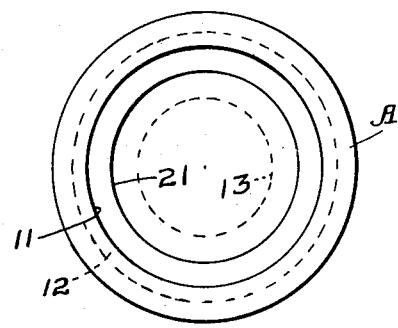
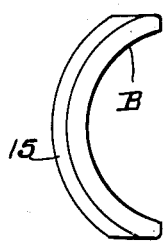
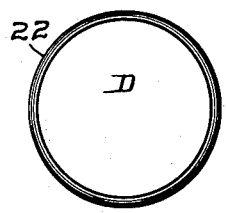
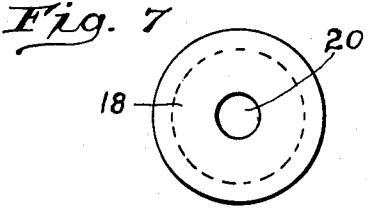
Inventor:
Arnold E. Dentler.
By Henry Fuchs
Atty.

United States Patent Office 2,733,915
Patented Feb. 7, 1956

2,733,915

SHOCK ABSORBING MECHANISMS FOR RAILWAY CAR TRUCKS

Arnold E. Dentler, Western Springs, Ill., assignor to W. H. Miner, Inc., Chicago, Ill., a corporation of Delaware Application November 3, 1952, Serial No. 318,408

3 Claims. (Cl. 267—9)

This invention relates to improvements in shock absorbing mechanisms adapted for use as snubbing devices in connection with truck springs of railway cars.

One object of the invention is to provide a simple and efficient shock absorbing mechanism comprising relatively slidable friction elements, wherein the friction elements are held in tight frictional engagement by rubber members which exert pressure on the friction elements and which are further designed to also yieldingly oppose relative lengthwise movement of the friction elements.

A more specific object of the invention is to provide a friction shock absorbing mechanism functioning as a snubbing device for railway car truck springs comprising a pair of friction casings movable toward and away from each other lengthwise of the mechanism, and a set of friction shoes in sliding frictional engagement with the interior walls of the casings, wherein relative movement of the casings toward each other is yieldingly opposed by a column of rubber blocks interposed between the casings and extending between the shoes, and wherein the column of rubber blocks includes a block which is under lateral compression and bears on the inner sides of the shoes to force the latter against the interior walls of the casings, and which is flattened out to laterally expand through lengthwise compression of the column to increase the pressure with which the shoes are pressed against the casing walls to increase the frictional resistance produced.

Other objects of the invention will more clearly appear from the description and claims hereinafter following.

In the accompanying drawing forming a part of this specification,

Figure 1 is a transverse vertical sectional view of my improved shock absorbing mechanism.

Figure 2 is a top plan view of Figure 1.

Figure 3 is a transverse, horizontal sectional view, corresponding substantially to the line 3—3 of Figure 1.

Figure 4 is a top plan view of the bottom friction casing shown in Figure 1.

Figure 5 is a top plan view of the friction shoe appearing at the right hand side of Figure 1.

Figure 6 is a top plan view of the rubber block at the mid portion of the column of rubber blocks shown in Figure 1.

Figure 7 is a plan view of one of the metal spacing discs employed in the column of rubber blocks shown in Figure 1.

As shown in the drawing, my improved friction shock absorbing mechanism comprises broadly top and bottom friction casings A—A, a pair of friction shoes B—B, and a resilient column composed of a series of rubber blocks C—C—D—C—C interposed between said casings and embraced between said shoes.

The top and bottom casings A—A are of the same design, each casing being in the form of a tubular shell of cylindrical cross section closed at one end by a transverse wall 10 and open at the other end. The transverse wall 10 is at the top end of the top casing A and that of the bottom casing A is at the lower end thereof. Each casing A presents opposed interior friction surfaces 11—11 at its open end, which are curved transversely. The portion of the cylindrical side wall of each casing, inwardly of the surfaces 11—11 thereof, is of increased interior diameter, thus providing retaining shoulders 12—12 for the shoes B at the inner ends of said friction surfaces. The walls 10—10 of the top and bottom casings A—A are provided with central seats 13—13 adapted to receive the usual centering projections of the top and bottom spring plates of a truck spring cluster.

The shoes B—B are of the same design and together form a friction unit. Each shoe B is in the form of a transversely curved plate having a lengthwise extending, transversely curved friction surface 14 on the outer side. The shoes B—B are arranged at opposite sides of the mechanism with their upper and lower ends extending into the top and bottom friction casings A—A, respectively, with the friction surfaces 14—14 thereof slidingly engaged with the friction surfaces 11—11 and 11—11 of the top and bottom casings. Each shoe B has laterally outturned retaining flanges 15—15 at the top and bottom ends engaged in back of the retaining shoulders 12—12 of the top and bottom casings A—A. These retaining flanges limit longitudinal separation of the casings A—A and further serve to hold the parts of the mechanism assembled.

The series of rubber blocks C—C—D—C—C extend between the shoes B—B and form a resilient column member which extends into the top and bottom casings A—A and bears on the end walls 10—10 of said casings. The rubber blocks C—C—C—C and the rubber block D are all of circular transverse cross section, that is, they are broadly cylindrical. Each of the blocks C is contracted between its top and bottom ends and presents an annular side face, which is concavely recessed, as indicated at 16. Each block C is further provided with a central vertical bore 17, which provides a space into which the material of the block flows when the same is flattened during compression.

The rubber block D is in the form of a solid member which is bulged outwardly between its top and bottom ends, as shown in Figures 1 and 6, and presents an annular side face 22 which is curved outwardly in vertical direction.

A plurality of spacing discs 18—18 and 19—19 are employed in the column of rubber blocks C—C—D—C—C, one of said discs 18 being shown in Figure 7. These spacing discs are preferably of metal and each disc is provided with a central opening 20 extending therethrough. Each disc 19 is generally similar to the disc 18 shown in Figure 3 and only differs therefrom in that it is slightly thicker than the disc 18. As shown in Figure 1, the discs 18 and 19 are preferably of the same diameter as the top and bottom end faces of the blocks C—C.

As shown in Figure 1, a disc 18 is interposed between the wall 10 of each follower casing A and the adjacent rubber block C, being vulcanized to the latter, and two such discs are interposed between each of these rubber blocks and the adjacent rubber block C, one of these discs being vulcanized to the first named block and the other to the last named block. A disc 19 is interposed between each of the last named blocks and the rubber block D being vulcanized to the former. The discs 18—18 which are interposed between the walls 10—10 of the top and bottom casings A—A and the adjacent rubber blocks are engaged in seats 21—21 provided in the walls 10—10 of said top and bottom casings A—A.

My improved shock absorbing mechanism, when employed as a snubbing device for railway car truck springs, replaces one or more of the spring units of the truck spring cluster, being interposed between the top and bottom spring plates of said cluster.

The operation of my improved shock absorbing mechanism is as follows: Upon the spring cluster of the truck of a railway car being compressed between the spring follower plates of said cluster, the top casing A is forced downwardly toward the bottom casing A, thereby compressing the column composed of the rubber blocks C—C—D—C—C in lengthwise direction, flattening the blocks. The block D in being flattened out is expanded laterally, pressing the shoes B—B outwardly against the friction surfaces of the casings A—A. High frictional resistance is thus provided during compression of the mechanism by relative sliding movement between the shoes B—B and the casings A—A. Inasmuch as the rubber blocks C—C and C—C have their side faces indented and are provided with internal bores 17—17 to accommodate the flow of the material thereof during flattening of said blocks, due to lengthwise compression of the column, clearance is maintained between the same and the inner sides of the shoes B—B during the entire compression and release strokes of the mechanism, thus eliminating all possibility of interference to compression and expansion of these rubber blocks which might otherwise occur through contact of these blocks with the inner sides of the shoes B—B.

During recoil of the truck springs, the pressure on the rubber blocks C—C—D—C—C is reduced, permitting the same to return to their normal shape and thereby returning the parts of the mechanism to the normal full release position illustrated in Figure 1.

I claim:

1. In a friction shock absorbing mechanism, the combination with a pair of friction casings closed at their outer ends and having interior friction surfaces at their inner ends; of a plurality of lengthwise extending friction shoes having their opposite ends telescoped within said casings, respectively, in sliding engagement with the friction surfaces of the latter; and a lengthwise compressible resilient column between said shoes, bearing at opposite ends on the closed ends of said casings, said column including a series of rubber blocks and spacing plates alternated with said blocks, the central block of said series having its sides buttressed against the inner sides of said shoes.

2. In a friction shock absorbing mechanism, the combination with a pair of friction casings closed at their outer ends and having interior friction surfaces at their inner ends; of a plurality of lengthwise extending friction shoes having their opposite ends telescoped within said casings, respectively, in sliding engagement with the friction surfaces of the latter; and a lengthwise compressible resilient column between said shoes, bearing at opposite ends on the closed ends of said casings, said column comprising a plurality of rubber blocks, each disposed between and vulcanized to a pair of metal plates, the central block in said column having its sides buttressed against the inner sides of said shoes.

3. In a friction shock absorbing mechanism, the combination with a pair of friction casings closed at their outer ends and having interior friction surfaces at their inner ends; of a plurality of lengthwise extending friction shoes having their opposite ends telescoped within said casings, respectively, in sliding engagement with the friction surfaces of the latter; and a lengthwise compressible resilient column between said shoes, bearing at opposite ends on the closed ends of said casings, said column comprising a plurality of rubber blocks, each disposed between and engaging the entire surface of and vulcanized to a pair of metal plates, which plates terminate inwardly of the inner surfaces of said shoes, the central block in said column curving outwardly from the plates to which it is vulcanized and having its sides buttressed against the inner sides of said shoes.

References Cited in the file of this patent

UNITED STATES PATENTS

| 98,540 | Alden | Jan. 4, 1870 |
| 1,809,198 | Glascodine | June 9, 1931 |
| 2,205,098 | Lamont | June 18, 1940 |
| 2,286,861 | Light | June 16, 1942 |
| 2,306,394 | Light | Dec. 29, 1942 |

FOREIGN PATENTS

| 732,631 | France | Jan. 22, 1934 |